Nov. 19, 1940.   C. B. KANE   2,221,838
NONSKID DEVICE FOR AUTOMOBILES
Filed Aug. 18, 1938
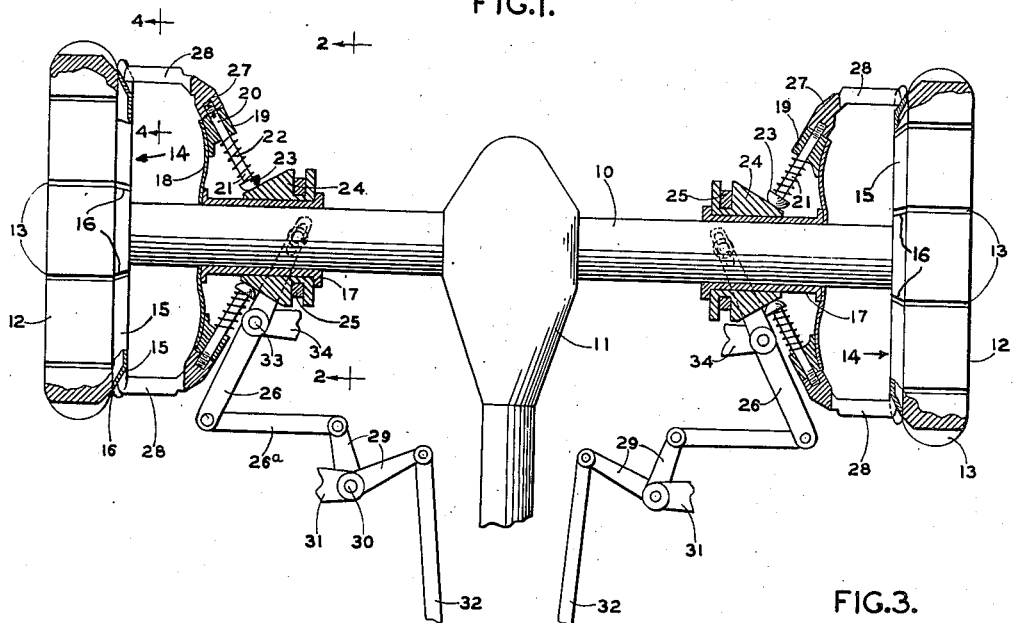
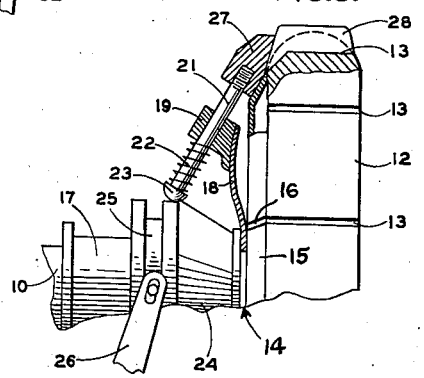
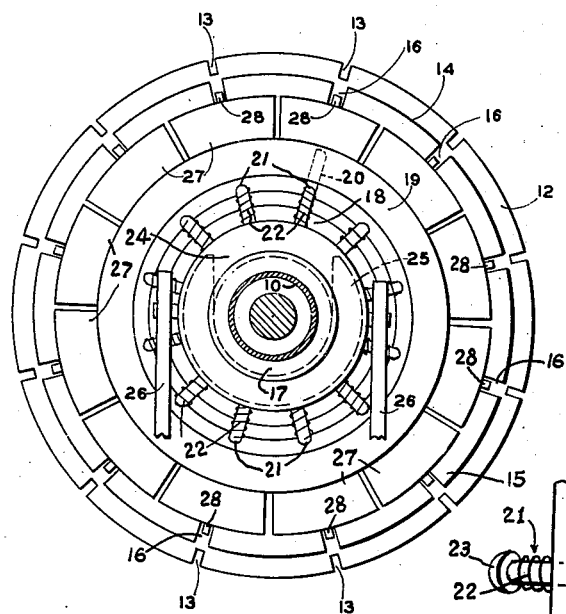
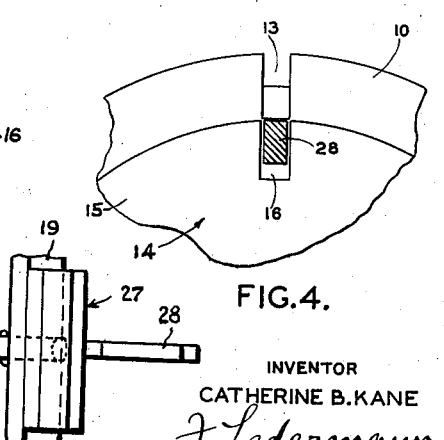
INVENTOR
CATHERINE B. KANE
BY *J. Ledermann*
ATTORNEY Patented Nov. 19, 1940

2,221,838

UNITED STATES PATENT OFFICE 2,221,838

NONSKID DEVICE FOR AUTOMOBILES

Catherine B. Kane, Greenwich, Conn.

Application August 18, 1938, Serial No. 225,534

4 Claims. (Cl. 301—47)

This invention relates to nonskid devices for automobiles, and has for its main object the provision of novel means for applying such a device to the wheels from within the vehicle.

The above and other objects will become apparent in the description below, in which characters of reference refer to like-named parts in the accompanying drawing.

Referring briefly to the drawing,

Figure 1 is a plan view, partly in section, of the rear end and wheels of an automobile.

Figure 2 is a cross-sectional view taken on the line 2—2 of Figure 1.

Figure 3 is an enlarged view of the right-hand side of Figure 1, showing some of the parts in other positions.

Figure 4 is a cross-sectional view taken on the line 4—4 of Figure 1.

Figure 5 is a plan view of the assembly of a detail.

Referring in detail to the drawing, the numeral 10 indicates the rear axle housing and the numeral 11 the differential. The rear tires are indicated by the numeral 12, and their tractive surfaces are provided with transverse spaced-apart grooves 13. A slightly cupped disc 14, having the form of a pie-plate, is secured against the inside of the wheel, with its outwardly-bent peripheral flange 15 lying against the rim of the tire. The flange 15 is provided with a plurality of slots 16 therethrough, equal in number to and radially aligned with the grooves 13.

A sleeve 17 is slidably mounted on the axle housing 10, and at its wheel end has a slightly bent and slightly resilient or yieldable washer-like spider 18 rigid thereon, extending radially, in the manner of a disc, radially outward from the housing 10. On its outer periphery a circular band 19 is rigid on the spider 18, the band 19 being formed frusto-conically. The band 19 has a plurality of openings 20 extending therethrough, radially and angularly outward. Pins 21 are slidably mounted in the openings 20 through the band 19, and are normally urged downward toward the housing 10 by springs 22. The pins 21 have heads 23 on their lower ends, these heads being slidable on the tapering surface of a cone 24 which in turn is slidably mounted on the sleeve 17. A peripheral groove is provided in the cone 24 in which a loose collar of horseshoe shape, 25, is slidably and pivotally engaged by a fork 26 for the purpose of sliding the cone back and forth, as will presently become apparent.

The outer extremities of the pin 21 are imbedded in blocks 27, and each block 27 has centrally positioned on its outer edge and rigid thereon, a horizontal finger 28. The fingers 28 are made of any suitable material, preferably metal, and serve as the nonskid elements for the tires. There are as many blocks 27, fingers 28, and pins 21, as there are of tire grooves 13.

A bell crank 29 is pivoted at 30 on a rigid bracket 31 which extends in a manner not shown from a rigid portion of the chassis, not shown. A rod 32, which is adapted to be pulled forward or pushed back in the reverse direction, is connected to any suitable operating lever or handle, not shown, mounted at any convenient position within the vehicle. The fork 26 is pivotally mounted at 33 on a bracket 34 which is likewise rigid with the chassis.

The various parts of the device are in the relative positions shown in Figures 1 and 2 when idle, that is, when in inoperative position. To insert the fingers 28 into the tire slots 13; that is, to mount the nonskid elements in place on the tire, the wheels of the vehicle are first jacked up with the fingers 28 radially aligned with the tire grooves 13, as shown in Figure 2. The rod 32 is then drawn forward, thus moving the cone 24 toward the wheel. This causes the cone 24 to push the pins 21 upward in the direction of their axes, and consequently lift the blocks 27 and their fingers 28 radially outward into positions in which each finger 28 is aligned horizontally with its adjacent tire groove 13. The latter occurs when the cone 24 has reached the end of its travel and rests against the end flange of the sleeve 17 adjacent the spider 18, as shown in Figure 3. Further movement of the rod 32 in the same direction then forces the spider 18 to be moved by the sleeve 17 against the disc 14 and causes the fingers 28 to slide through the slots 16 in the latter and into the grooves 13 of the tire. The rod 32 is then locked in extreme forward position by any suitable means adjacent the driver, not shown, as long as the fingers 28 are to be kept in the tire grooves 13. When it is desired to withdraw the fingers from the tire grooves, the rod 32 is pushed back to its original inactive position, after the vehicle has been brought to a stop with the area of contact between the wheel and the road lying between two adjacent grooves 13.

I claim:

1. In an automobile, a nonskid device adapted to be mounted on a tire, comprising a sleeve slidably and rotatably mounted on the rear axle housing of the automobile, a cone slidably and rotatably mounted on said sleeve, means for sliding said cone on said sleeve and said sleeve on said housing, a disc-like spider rigidly fixed on the outer end of said sleeve, a peripheral band rigid on said spider and having a plurality of openings extending radially and axially outwardly therethrough, pins slidably mounted in said openings and having heads on their inner ends in slidable contact with and adapted to ride on the surface of said cone, blocks arranged on the outer surface of said band, the other ends of said pins being imbedded in said blocks, each of said blocks having a horizontal finger extending outward therefrom, said tire having transverse grooves in its tread, said cone upon being slid toward said tire causing said pins to rise on said cone and thereby to extend said blocks and fingers radially outward, further sliding of said cone in the same direction causing said cone to push said spider toward the wheel and to move said fingers horizontally into said tire grooves, and means for sliding said cone toward or away from said wheel.

2. In an automobile, a nonskid device adapted to be mounted on a tire, comprising a sleeve slidably and rotatably mounted on the rear axle housing of the automobile, a cone slidably and rotatably mounted on said sleeve, means for sliding said cone on said sleeve and said sleeve on said housing, a yieldable disc-like spider rigidly fixed on the outer end of said sleeve, a peripheral band rigid on said spider and having a plurality of openings extending radially and axially outwardly therethrough, pins slidably mounted in said openings and having their inner ends in slidable contact with and adapted to ride on the surface of said cone, blocks arranged on the outer surface of said band, the other ends of said pins being imbedded in said blocks, each of said blocks having a horizontal finger extending outward therefrom, said tire having transverse grooves in its tread, said cone upon being slid toward said tire causing said pins to rise on said cone and thereby to extend said blocks and fingers radially outward, further sliding of said cone in the same direction causing said cone to push said spider toward the wheel and to move said fingers horizontally into said tire grooves, and means for sliding said cone toward or away from said wheel.

3. In an automobile, a nonskid device adapted to be mounted on a tire, comprising a sleeve slidably and rotatably mounted on the rear axle housing of the automobile, a cone slidably and rotatably mounted on said sleeve, means for sliding said cone on said sleeve and said sleeve on said housing, a yieldable disc-like spider rigidly fixed on the outer end of said sleeve, a peripheral band rigid on said spider and having a plurality of openings extending radially and axially outwardly therethrough, pins slidably mounted in said openings and having heads on their inner ends in slidable contact with and adapted to ride on the surface of said cone, blocks arranged on the outer surface of said band, the other ends of said pins being secured to said blocks, each of said blocks having a horizontal finger extending outward therefrom, said tire having transverse grooves in its tread, said cone upon being slid toward said tire causing said pins to rise on said cone and thereby to extend said blocks and fingers radially outward, further sliding of said cone in the same direction causing said cone to push said spider toward the wheel and to move said fingers horizontally into said tire grooves, and means for sliding said cone toward or away from said wheel.

4. In an automobile, a nonskid device adapted to be mounted on a tire, comprising a sleeve slidably and rotatably mounted on the rear axle housing of the automobile, a cone slidably and rotatably mounted on said sleeve, means for sliding said cone on said sleeve and said sleeve on said housing, a disc-like spider rigidly fixed on the outer end of said sleeve, a peripheral band rigid on said spider and having a plurality of openings extending radially and axially outwardly therethrough, pins slidably mounted in said openings and having heads on their inner ends, blocks arranged on the outer surface of said band, the outer ends of said pins being imbedded in said blocks, coiled springs surrounding said pins between said blocks and said heads urging said heads into slidable contact with the surface of said cone, each of said blocks having a horizontal finger extending outward therefrom, said tire having transverse grooves in its tread, said cone upon being slid toward said tire causing said pins to rise on said cone and thereby to extend said blocks and fingers radially outward, further sliding of said cone in the same direction causing said cone to push said spider toward the wheel and to move said fingers horizontally into said tire grooves, and means for sliding said cone toward or away from said wheel.

CATHERINE B. KANE.